(12) United States Patent
Han et al.

(10) Patent No.: US 8,279,546 B1
(45) Date of Patent: *Oct. 2, 2012

(54) SYSTEMS AND METHODS FOR SYNC MARK DETECTION USING CORRELATION

(75) Inventors: Ke Han, Fremont, CA (US); Zining Wu, Los Altos, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,068

(22) Filed: Jun. 14, 2011

Related U.S. Application Data

(63) Continuation of application No. 11/810,832, filed on Jun. 6, 2007, now Pat. No. 7,974,034.

(60) Provisional application No. 60/811,665, filed on Jun. 7, 2006.

(51) Int. Cl.
*G11B 5/09* (2006.01)

(52) U.S. Cl. ............ 360/51; 360/29; 360/31; 360/48; 360/65; 360/77.02

(58) Field of Classification Search .......... None
See application file for complete search history.

(56) References Cited

U.S. PATENT DOCUMENTS

| | | | |
|---|---|---|---|
| 5,148,453 A * | 9/1992 | Newby et al. | 375/368 |
| 5,218,562 A * | 6/1993 | Basehore et al. | 708/422 |
| 5,793,548 A * | 8/1998 | Zook | 360/51 |
| 5,856,986 A * | 1/1999 | Sobey | 714/744 |
| 5,901,010 A * | 5/1999 | Glover et al. | 360/78.12 |
| 5,953,378 A * | 9/1999 | Hotani et al. | 375/341 |
| 6,023,386 A * | 2/2000 | Reed et al. | 360/51 |
| 6,128,358 A * | 10/2000 | Urata | 375/366 |
| 6,345,074 B1 | 2/2002 | Turk et al. | |
| 6,493,162 B1 * | 12/2002 | Fredrickson | 360/51 |
| 6,532,567 B2 | 3/2003 | Ino | |
| 6,603,622 B1 | 8/2003 | Christiansen et al. | |
| 6,604,204 B1 | 8/2003 | Ozdemir et al. | |
| 6,657,802 B1 * | 12/2003 | Ashley et al. | 360/51 |
| 6,662,338 B1 * | 12/2003 | Rezzi et al. | 714/795 |
| 6,680,807 B1 | 1/2004 | She et al. | |
| 6,707,626 B2 | 3/2004 | Esumi | |
| 6,856,480 B2 * | 2/2005 | Kuki et al. | 360/49 |
| 7,203,015 B2 * | 4/2007 | Sakai et al. | 360/48 |
| 7,256,953 B2 * | 8/2007 | Watanabe et al. | 360/51 |
| 7,403,351 B1 | 7/2008 | Han et al. | |
| 7,499,233 B1 | 3/2009 | Han et al. | |
| 7,859,782 B1 * | 12/2010 | Lee | 360/51 |
| 7,881,164 B1 * | 2/2011 | Han et al. | 369/44.11 |
| 2003/0055572 A1 | 3/2003 | Kuki et al. | |
| 2005/0193047 A1 * | 9/2005 | Fu et al. | 708/300 |

\* cited by examiner

*Primary Examiner* — Dismery Mercedes

(57) ABSTRACT

Systems and methods for detecting and designing enhanced disk sync marks using correlation detection are disclosed. The enhanced sync marks provide better noise immunity and higher detection rates over traditional Viterbi-based detection schemes even with a shorter sync mark length. The disk sync mark may provide optimal noise immunity for a particular target polynomial or a plurality of common target polynomials. The minimum Euclidean distance between a candidate sync mark and a plurality of right-shifted versions of the candidate sync mark is computed and compared with other candidate sync marks. The sync mark with the largest minimum Euclidean distance is then selected as the optimal mark. Systems and methods are also disclosed for detecting and designing a disk sync mark using correlation detection when the polarity of the disk is unknown or time-varying.

20 Claims, 7 Drawing Sheets

SYSTEMS AND METHODS FOR SYNC MARK DETECTION USING CORRELATION

CROSS-REFERENCE TO RELATED APPLICATION

This present disclosure is a continuation of U.S. application Ser. No. 11/810,832, filed on Jun. 6, 2007, which claims priority under 35 U.S.C. §119(e) to U.S. Provisional Patent Application No. 60/811,665, filed Jun. 7, 2006. The disclosures of the applications referenced above are incorporated herein by reference.

BACKGROUND OF THE INVENTION

This invention relates generally to magnetic recording channels and, more particularly, to magnetic recording channels with improved sync mark design and detection using correlation.

Data is stored on contemporary magnetic hard disk drives in concentric tracks around the recording surface or surfaces of the disk or disks. Each track may be divided into a number of addressable sectors, with each sector including a preamble, sync mark, and user data.

The preamble may, for example, contain a portion that enables the read channel to adjust its gain and allow a phase locked loop (PLL) to achieve bit synchronization. The preamble may also include a DC erase portion in which there are no logical transitions (e.g., an uninterrupted string of zeros) for a specified length. Since a string of bits with no logical transitions may be illegal everywhere else on the disk, the DC erase portion of the preamble may uniquely identify this portion as being part of the sector preamble.

The sync mark may follow the preamble on the disk and may be designed to be of any suitable length. Since the next bit of data after the sync mark starts the user data, it is crucial that the sync mark be easily detected and detected extremely reliably. Current sync mark designs may impose several restraints on the sync mark to increase detection probability, including, for example, no T-spaced transitions and no transitions on byte boundaries, to reduce or eliminate most-likely error events.

As data densities and data rates continue to increase, however, more noise is inevitably introduced into magnetic data channels. For example, in order to increase the areal densities of magnetic media, many media manufacturers are using perpendicular recording. Unlike traditional longitudinal recording, where the magnetization is lying in the plane of the magnetic medium, with perpendicular recording the media grains are oriented in the depth of the magnetic medium with their magnetization pointing either up or down, perpendicular to the plane of the disk. Using perpendicular recording, manufacturers have exceeded magnetic recording densities of 100 Gbits per square inch, and densities of 1 Terabit per square inch are feasible.

As storage densities increase, the signal processing and detection of magnetic channels becomes more difficult. Sources of distortion, including media noise, electronics and head noise, inter-track interference, thermal asperity, partial erasure, and dropouts, are becoming more pronounced. Particularly troublesome are signal-dependent types of noise, such as transition jitter, because these types of noise are quickly becoming the dominant sources of detection errors.

Because bit error rates (BER) in these new magnetic recording channels are increasing, a new sync mark design and detection scheme is needed to more reliably detect disk sync marks. Traditional sync mark detection schemes using Viterbi detection may be inadequate to support these high data rate channels. If a disk sync mark is not reliably detected on the first attempt, the disk spindle motor typically must drive the disk completely around again and attempt redetection of the sync mark. This reduces drive data rates and cripples overall system performance.

Accordingly, it is desirable to provide systems and methods for enhanced sync mark detection using correlation. The enhanced sync mark design and detection scheme may provide a gain of several dB over traditional sync mark designs.

SUMMARY OF THE INVENTION

In accordance with principles of the present invention, an improved sync mark design and detection scheme for magnetic data channels is provided. One improvement of the sync mark detection scheme is the use of correlation detection instead of Viterbi-based detection in detecting the improved sync mark on the hard disk.

To determine the optimal disk sync mark for use with correlation detection, an exhaustive search may be performed on the bit space of potential bit patterns of a desired length. First, an initial pattern is selected for the sync mark. Then, a plurality of right bit-shifted sync mark patterns are defined, with the disk preamble shifted into the higher-order bit positions of the shifted patterns. The minimum Euclidean distance is then computed between the selected sync mark pattern and all the shifted versions of the selected sync mark pattern. This process may be repeated until all potential bit patterns in the bit space have been tested. The bit pattern with the largest minimum Euclidean distance between the bit pattern and all the right-shifted versions of the bit pattern is selected as the optimal disk sync mark.

In some embodiments, to reduce the bit space of potential sync mark patterns, adjacent bits of the selected sync mark pattern are paired up (i.e., the first and second bits are paired, the third and forth bits are paired, and so on). A restriction is then imposed on all the potential sync mark patterns so that these paired up bits are required to take the same value. This restriction may decrease the bit space of the sync mark pattern search from $2^N$ potential patterns to $2^{N/2}$ potential patterns, where N is the length of the sync mark. Imposing this restriction may exponentially reduce the time needed to complete the sync mark search while still yielding a near-optimal pattern for the sync mark.

Other assumptions may also be made, in some embodiments, to reduce the complexity, or to increase the applicability, of the sync mark search. For example, in magnetic storage systems the recording channel is generally shaped to a specific target polynomial or target response. The sync mark may be selected assuming a particular target (e.g., [4, 7, 1]) or an exhaustive search using all common targets may be performed to yield the overall best general-purpose sync mark.

In some embodiments, especially when the polarity of the system is unknown (or time-varying), a plurality of right bit-shifted versions of the selected sync mark pattern and a plurality of right bit-shifted versions of the sign-flipped sync mark pattern may be defined. The minimum Euclidean distance is then computed between the selected sync mark pattern and all the shifted versions of both the selected sync mark pattern and the sign-flipped sync mark pattern. After the minimum Euclidean distance is computed for all potential bit patterns, the bit pattern with the largest minimum Euclidean distance between the bit pattern and all the shifted versions of both the bit pattern and the sign-flipped bit pattern is selected as the optimal disk sync mark. Various assumptions and restrictions (e.g., as described above) may also be imposed on the sync mark patterns in these embodiments as well.

To detect the new sync mark, correlation detection is used instead of Viterbi-based detection. Detection timing is established by the sector preamble, and the detection may be performed on the same period as the period of the preamble (e.g., every 4 bit patterns, or 4 T). In embodiments where the polarity is unknown or time-varying, the preamble may be used to establish two timing phases (a first phase and a second, opposite phase shifted by 180 degrees) and correlation detection may be performed more frequently (e.g., twice as frequently, or every 2 T).

In some embodiments, an apparatus for detecting a disk sync mark is provided including means for reading a plurality of sector preamble bits and means for establishing at least one timing phase based on the sector preamble bit read. Correlation detection circuitry means is provided for detecting the disk sync mark, the detection performed by the correlation detection circuitry means at a period determined by the at least one timing phase.

Further features of the invention, its nature and various advantages, will become more apparent from the accompanying drawings and the following detailed description.

DETAILED DESCRIPTION

Embodiments of the present invention relate to systems and methods for detecting disk sync marks using correlation detection. The present invention also provides an improved sync mark design for use with correlation detection.

Figure 1:
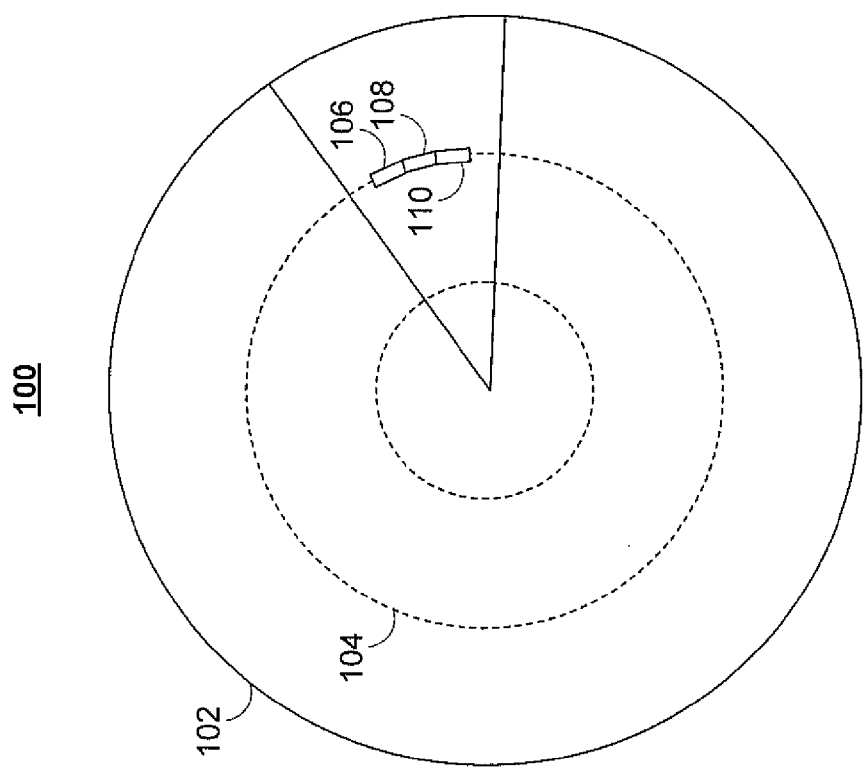
FIG. 1 is a simplified diagram of an illustrative disk platter in accordance with one embodiment of the invention.

The improved sync mark design and detection scheme using correlation detection may be implemented in any magnetic hard disk drive, including drives implementing perpendicular recording. For example, FIG. 1 shows illustrative hard disk 100 in accordance with one embodiment of the present invention. Disk platter 102 may contain numerous concentric data tracks, such as track 104. These tracks may be divided into sectors, with each sector including sector preamble 106, sector sync mark 108, and user data 110.

Figure 2:
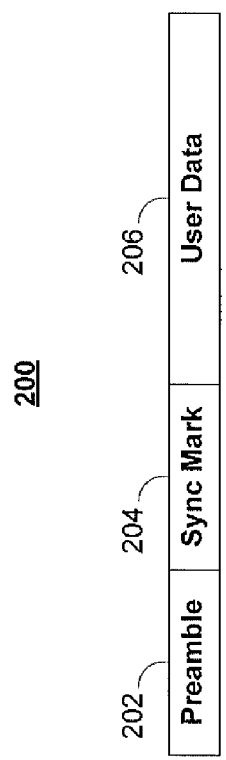
FIG. 2 is a diagram of an illustrative preamble, sync mark, and user data structure in accordance with one embodiment of the invention.

FIG. 2 shows illustrative sector data 200 in accordance with one embodiment of the present invention. Sector data 200 includes preamble portion 202, which may be used to establish timing and bit synchronization. In some embodiments, preamble portion 202 includes 120 bits, but any suitable number of bits may be used in other embodiments. The preamble pattern may include a repeating "1100" pattern portion and an optional DC erase portion.

After preamble portion 202, sector data 200 may include a sector sync mark. Sync mark 204 may include any suitable number of bits. In some embodiments, the length of sync mark 204 is some multiple of the preamble period. One example uses a 4 T-period repeating "1100" pattern described above as the sector preamble. Then sync mark 204 may be 4N bits long, where N is any positive integer. The bit following sync mark 204 begins user data portion 206.

As described above, in typical hard drive operation it is crucial that the sector sync mark be detected easily and reliably so that the start of the user data may be readily identified. If detection of the sync mark fails, the disk may have to rotate around to attempt detection of sync mark again, which is inefficient and highly undesirable. This can adversely effect data rates and overall system performance.

Figure 3:
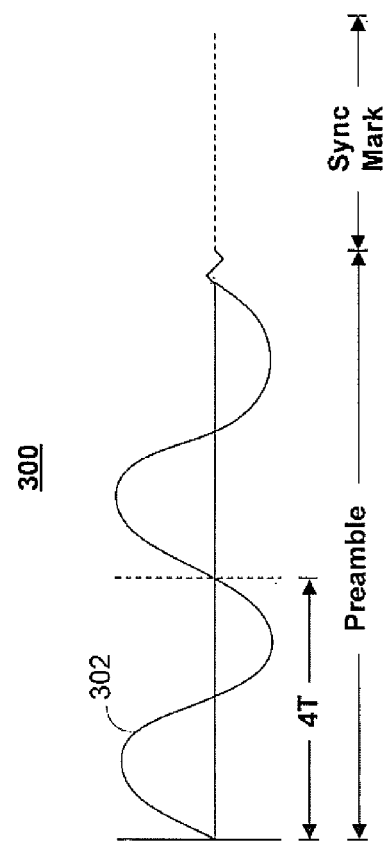
FIG. 3 shows an illustrative sinusoidal readback waveform corresponding to a sector preamble read in accordance with one embodiment of the invention.

FIG. 3 shows illustrative readback graph 300 in accordance with one embodiment of the present invention. In the depicted embodiment, readback waveform 302 is the readback waveform for the sector preamble and is substantially sinusoidal with a period of 4 T. It is to be clearly understood, however, that the period of the sector preamble readback waveform may be larger or smaller than 4 T in other embodiments.

To determine the optimal sync mark to be used for correlation detection, an exhaustive search of all potential sync mark bit patterns may be performed in some embodiments. For example, if a 4N-bit sync mark is desired, then an exhaustive search may be performed of all potential 4N-bit patterns for use as the sector sync mark. The optimal sync mark will be the candidate with the greatest immunity to noise, as measured by the Euclidean distance between the pattern and all 4-bit right-shifted bit patterns, as described in more detail with regard to FIGS. 4-6, below.

Figure 4:
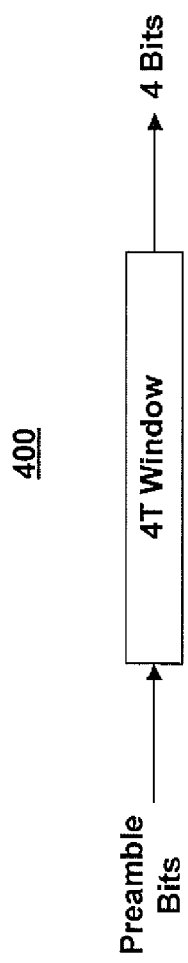
FIG. 4 is an illustrative sliding window for defining right bit-shifted versions of a potential sync mark in accordance with one embodiment of the invention.

As shown in FIG. 4, a sliding window may be used to define N right-shifted versions of each sync mark to be tested. The lower order bits are shifted out, while the sector preamble is shifted into the higher order bits. Although, in the example of FIG. 4, four bits are shifted out and four preamble bits are shifted into the window, this is done for clarity only and not by way of limitation. Preferably, the number of bits shifted in and out is the number of bits in one period of the sector preamble. This is done because correlation detection may be performed based on the preamble period, as described in more detail below.

Figure 5:
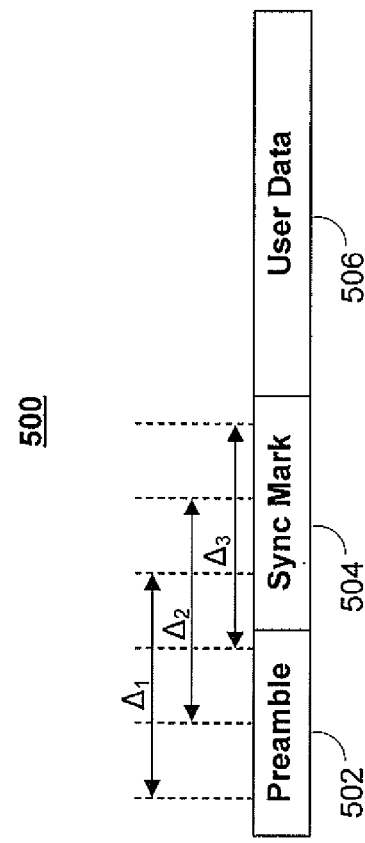
FIG. 5 shows three illustrative sync mark read windows in accordance with one embodiment of the invention.

FIG. 5 shows illustrative sector data 500. As shown in FIG. 2, sector data 500 may include preamble portion 504, sync mark portion 504, and user data portion 506. Because, in some embodiments, detection timing is established by the sector preamble, correlation detection may be performed every preamble period (e.g., 4 T). For example, one correlation decision may be based on read window $\Delta_1$. The next detection decisions may occur at read windows $\Delta_2$ and $\Delta_3$, as more bits are read in the direction of disk rotation toward the actual sync mark. As can be seen from the example of FIG. 5, eventually the correlation detection read window will encompass the actual sync mark, and the sync mark may be declared detected.

To determine the optimal sync mark pattern, the minimum Euclidean distance, $D_{min}$, between a sync mark candidate pattern and all right-shifted versions of the sync mark candidate pattern may be computed in accordance with:

$$D_{min}(SM_0) = \min E\{SM_1, \ldots, SM_N\} \quad (EQ\ 1)$$

where $SM_0$ is the sync mark candidate to be tested, E is the Euclidean distance function, and $SM_1$ through $SM_N$ are right-shifted versions of $SM_0$. Preferably, the right-shifted versions are shifted the number of bits of the preamble period (i.e., the period of the correlation detection). In this way, $D_{min}$ represents a noise immunity metric for the sync mark candidate, $SM_0$, that may be used to compare the noise immunity of $SM_0$ with the noise immunity of other potential sync mark candidates.

In a similar manner, an exhaustive search is performed over all potential sync mark candidates for the optimal candidate pattern. Thus, a search is performed for the sync mark candidate with the greatest immunity to noise (i.e., the largest minimum Euclidean distance between the candidate pattern and all shifted versions of the candidate pattern) in accordance with:

$$D_{max} = \max\{D_{min}(SM_0)\} \quad (EQ\ 2)$$

for all potential candidate patterns, $SM_0$. For example, if the desired sync mark is 4N bits in length, an exhaustive search for all $SM_0$ in $[0\sim2^{4N}]$ may be performed. The sync mark candidate with the greatest immunity to noise metric is the optimal candidate and may be used as the disk sync mark.

To reduce the complexity of the search, in some embodiments, one or more simple restrictions are imposed on the form of potential sync mark candidates. These restrictions do not significantly effect the sync mark candidate's immunity to noise, but may help drastically improve the optimal sync mark pattern search time and search complexity. For example, every two adjacent bits (e.g., bits 1 and 2, bits 3 and 4, bits 5 and 6, etc.) of the sync mark candidate may be paired and forced to take the same value. For a sync mark length of N, this can reduce the complexity of the search from $2^N$ to $2^{N/2}$. By facilitating the search in this way, the optimal sync mark may be found in less time, and the search may consume less system resources.

In some embodiments, the sync mark search is also performed across multiple target channels. For example, the pattern with the greatest noise immunity using EQ 2, above, for targets [4,7,1,0], [5,6,0,−1], [5,4,−2,−1], and [5,5,−2,0] may be computed. The best overall sync mark for all common targets may then be used as the disk sync mark. The aforementioned targets are merely illustrative. Any number and form of target polynomials may be included in the search for the optimal sync mark, if desired.

The optimal sync mark pattern for correlation detection yields a performance gain of several dB over traditional sync mark designs even with a much shorter sync mark length. For example, with the enhanced design described above, a 12-bit sync mark has almost a 4 dB gain in noise immunity over a traditional 36-bit sync mark design. The use of a shorter sync mark may increase the storage capacity of the disk and increase data rates as well. More importantly, the increase in noise immunity results in a more reliable sync mark detection.

In some embodiments, in order to remove DC offset, a detected sample is passed through a 1-D or 1-D² block (or any other filter or circuitry operable to remove DC offset). Simulated results with signal phase error of 0.1 T and signal asymmetry of −30 percent still yielded over a 2 dB gain in noise immunity over traditional sync mark designs using Viterbi-based detection. This performance gain was seen even with a much shorter sync mark (i.e., a 12-bit mark as opposed to a standard 36-bit or longer mark).

In some embodiments, the polarity of the disk may be unknown. To detect a sync mark on a drive whose polarity is unknown, correlation detection may be performed at every P/2 bit periods, where P is the preamble period. The preamble may be used to define two phases, a normal phase and an opposite phase inverted by 180 degrees. Right-shifted versions of the sync mark and the sign-flipped sync mark may then be defined. On the normal phase defined by the sector preamble, the correlation detection window is looking for the sync mark, but may instead see a P-bit right-shifted version of the sync mark or a (P+P/2)-bit right-shifted version of the sign-flipped sync mark. Similarly, on the opposite phase defined by the sector preamble, the correlation detection window is looking for the sign-flipped sync mark, but may instead see a P-bit right-shifted version of the sign-flipped sync mark or a (P+P/2)-bit right-shifted version of the sync mark.

Accordingly, the optimal sync mark design when the polarity is not known or time-varying may be the sync mark pattern with the maximum Euclidean distance between the sync mark pattern and any of the P-bit right-shifted versions of the sync mark and the (P+P/2)-bit right-shifted versions of the sign-flipped sync mark. The bits shifted into the right-shifted versions of the sync mark pattern and sign-flipped sync mark pattern are the preamble bits and sign-flipped preamble bits, respectively.

The sync mark pattern that maximizes the minimum Euclidean distance between the sync mark pattern and any of the P-bit right-shifted versions of the sync mark and the (P+P/2)-bit right-shifted versions of the sign-flipped sync mark also maximizes the Euclidean distance between the signed-flipped sync mark pattern and both the P-bit right-shifted versions of the sign-flipped sync mark and the (P+P/2)-bit right-shifted versions of the sync mark. Even with unknown polarity, the optimal sync mark using correlation detection yields a noise immunity gain of several dB over traditional sync marks designs of much longer length.

Figure 6:
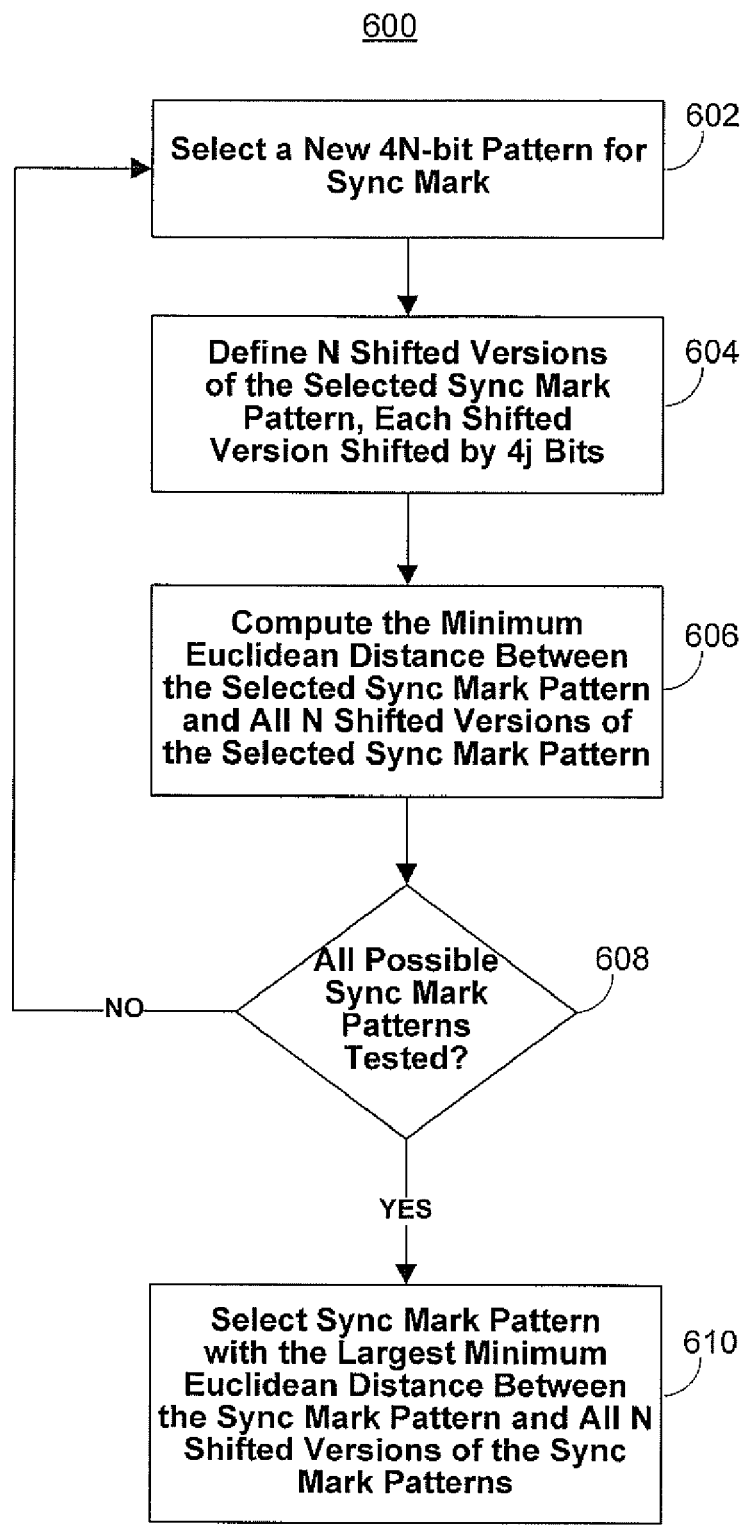
FIG. 6 is an illustrative process for selecting the optimal sync mark pattern when the polarity is fixed or known in accordance with one embodiment of the invention.

FIG. 6 shows illustrative process 600 for selecting an optimal sync mark for correlation detection. At step 602, a 4N-bit pattern is initially selected as a sync mark candidate. For example, the all ones pattern, all zeros pattern, or the optimal pattern for use with Viterbi-based detection schemes may be initially selected at step 602. At step 604, N shifted versions of the selected pattern are defined, each shifted version right-shifted by 4j bits, where j is an integer from 1 to N. The appropriate number of sector preamble bits may be shifted into the shifted versions of the selected pattern.

At step 606, the minimum Euclidean distance between the selected pattern and all the defined shifted versions is computed. At step 608, a determination is made whether all potential sync mark patterns have been tested. For example, in some embodiments, the entire bit space (i.e., $2^{4N}$ patterns) are tested. In other embodiments, adjacent pairs of bits (i.e., bits 1 and 2, bits 3 and 4, bits 5 and 6, etc.) are forced to take the same value, facilitating the computation by reducing the bit space to search. If not all of the potential bit patterns have been tested, then process 600 returns to step 602 by selecting a new 4N-bit pattern as a sync mark candidate.

Once, at step 608, a determination is made that all the potential sync mark patterns have been tested, at step 610 the sync mark candidate with the largest minimum Euclidean distance between the sync mark candidate and all the shifted versions of the sync mark candidate is selected as the optimal sync mark. This sync mark may then be written to the disk.

In some embodiments, the exhaustive sync mark search is performed for a single target polynomial. In other embodiments, the optimal sync mark for several common target polynomials is searched and selected as the optimal sync mark.

In practice, one or more steps shown in illustrative process 600 may be combined with other steps, performed in any suitable order, performed in parallel (e.g., simultaneously or substantially simultaneously) or removed.

Figure 7:
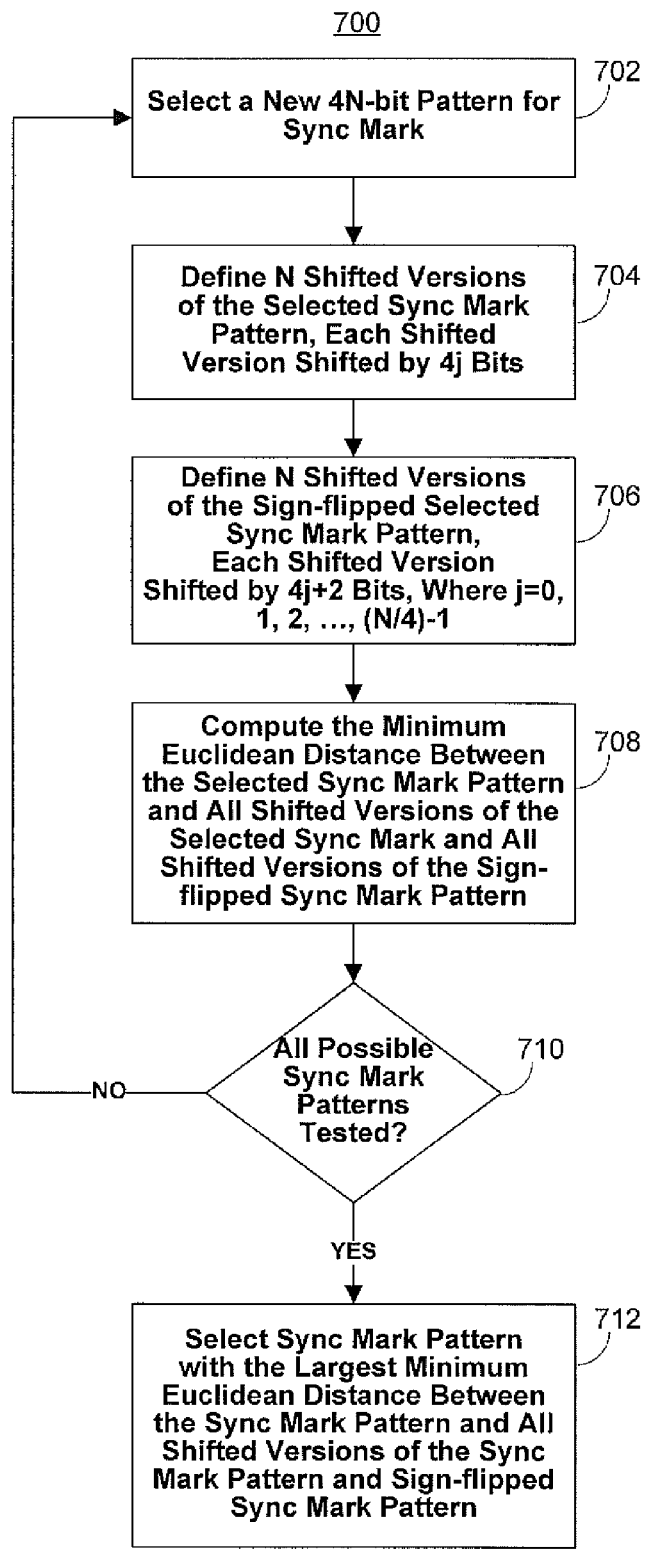
FIG. 7 is an illustrative process for selecting the optimal sync mark pattern when the polarity is time-varying or unknown in accordance with one embodiment of the invention.

FIG. 7 shows illustrative process 700 for selecting an optimal sync mark for correlation detection when the disk polarity is unknown or time-varying. At step 702, a 4N-bit pattern is initially selected as a sync mark candidate. For example, the all ones pattern, all zeros pattern, or the optimal pattern for use with Viterbi-based detection schemes may be initially selected at step 702. At step 704, N shifted versions of the selected pattern are defined, each shifted version right-shifted by 4j bits, where j is an integer from 1 to N. The appropriate number of sector preamble bits are shifted into the shifted versions of the selected pattern. At step 706, N shifted versions of the sign-flipped selected pattern are defined, each shifted version right-shifted by 4j+2 bits, where j is an integer from 0 to N−1.

At step 708, the minimum Euclidean distance between the selected pattern and all the defined shifted versions (and sign-flipped shifted versions) is computed. At step 710, a determination is made whether all potential sync mark patterns have been tested. For example, in some embodiments, the entire bit space (i.e., $2^{4N}$ patterns) are tested. In other embodiments, adjacent pairs of bits are forced to take the same value, facilitating the computation by reducing the bit space. If not all of the potential bit patterns have been tested, then process 700 returns to step 702 by selecting a new 4N-bit pattern as a sync mark candidate.

Once, at step 710, a determination is made that all the potential sync mark patterns have been tested, at step 712 the sync mark candidate with the largest minimum Euclidean distance between the sync mark candidate and all the shifted versions of the sync mark candidate (and sign-flipped sync mark candidate) is selected as the optimal sync mark.

In practice, one or more steps shown in illustrative process 700 may be combined with other steps, performed in any suitable order, performed in parallel (e.g., simultaneously or substantially simultaneously) or removed.

Figure 8:
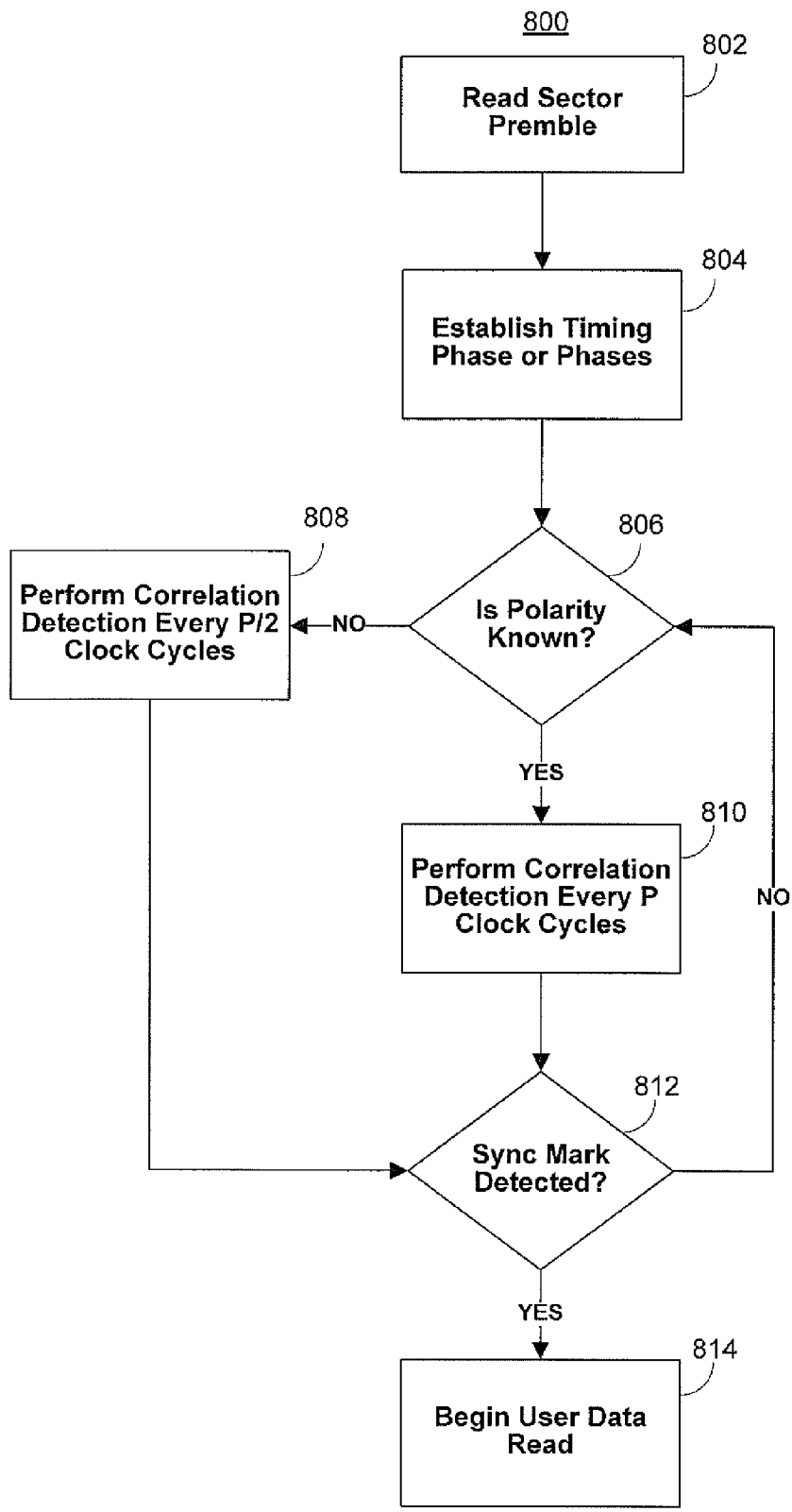
FIG. 8 is an illustrative process for detecting a disk sync mark using correlation detection in accordance with one embodiment of the invention.

FIG. 8 shows illustrative process 800 for detecting the sync mark of the present invention using correlation detection in accordance with one embodiment of the invention. At step 802, the sector preamble is read. For example, in some embodiments, the sector preamble contains a 120-bit repeating "1100" pattern. In other embodiments, longer or shorter preambles may be used. Timing parameters may then be established from the sector preamble read. For example, a PLL may be locked to the phase of the sector preamble. One or more timing phases may then be established at step 804. For example, as described above, two phases (a normal phase and an opposite phase shifted by 180 degrees) may be established from the sector preamble if the polarity of the disk is unknown or time-varying. As another example, a single timing phase may be established from the sector preamble read if the polarity is known. If a determination is made at step 806 that the polarity is known, correlation detection may be performed every P clock cycles at step 810, where P is the period of the timing phase or phases established at step 804. If, at step 806, the polarity is not known, then correlation detection may be performed every P/2 clock cycles at step 808.

In some embodiments, in order to perform correlation detection, a particular target may be assumed. The target output sequence may be calculated for the expected sync mark pattern, $S_0$. The sign-flipped version of $S_0$, $\sim S_0$, may then be defined, as well as the one or more right-shifted versions of $S_0$ and/or $\sim S_0$. For example, in one illustrative embodiment, the 4i-T right-shifted version and the 4i+2-T right-shifted version of $S_0$ is defined. Similarly, the 4i-T right-shifted version and the 4i+2-T right-shifted version of $\sim S_0$ may also be defined. These right-shifted versions of $S_0$ and $\sim S_0$ are merely illustrative. Any other right-shifted versions of $S_0$ and $\sim S_0$ may additionally or alternatively be defined. Based on the sector preamble read, a timing loop may be locked to two phases, $\Theta_0$ and $\Theta_1$. On $\Theta_0$, the correlation detection circuitry may look for the expected sync mark pattern $S_0$. However, instead of seeing $S_0$, one of the right-shifted versions of $S_0$ or $\sim S_0$ may be seen by the correlation detection circuitry.

On $\Theta_0$, the Euclidean distance between the received sequence, R, and $S_0$ may be computed. If the Euclidean distance is less than a target minimum Euclidean distance, the correlation detection circuitry may signal that the sync mark has been found and the polarity of the disk is positive. If the Euclidean distance between the received sequence R and $S_0$ is not less than the target minimum Euclidean distance, the correlation detection circuitry may attempt detection on $\Theta_1$, which is the opposite phase of $\Theta_0$. On $\Theta_1$, the correlation detection circuitry may look for the sign-flipped version of the expected sync mark pattern, or $\sim S_0$. However, instead of seeing $\sim S_0$, one of the right-shifted versions of $S_0$ or $\sim S_0$ may be seen by the correlation detection circuitry.

On $\Theta_1$, the Euclidean distance between the received sequence, R, and $\sim S_0$ may be computed. If the Euclidean distance is less than a target minimum Euclidean distance, the correlation detection circuitry may signal that the sync mark has been found and the polarity of the disk is negative. If the Euclidean distance between the received sequence, R, and $S_0$ is not less than the target minimum Euclidean distance, the correlation detection circuitry can attempt detection on $\Theta_0$ once again for the next read window. This process may continue until the sync mark is detected (or an error condition, timeout, or end of sector condition occurs).

There are several advantages of performing sync mark correlation detection every P or P/2 clock cycles, where P is the period of the timing phase or phases established at step 804, instead of every clock cycle. Hardware requirements may be significantly reduced, and the detection pattern is given more time to settle. Moreover, a sync mark pattern with greater immunity to noise may be selected as the disk sync mark, as described above.

Correlation detection may continue until the sector sync mark is declared detected at step 812. After sync mark detection, the next bit of data may begin the user data. After detection of the sync mark, at step 814 the user data read may begin.

In practice, one or more steps shown in illustrative process 800 may be combined with other steps, performed in any suitable order, performed in parallel (e.g., simultaneously or substantially simultaneously) or removed.

Figure 9:
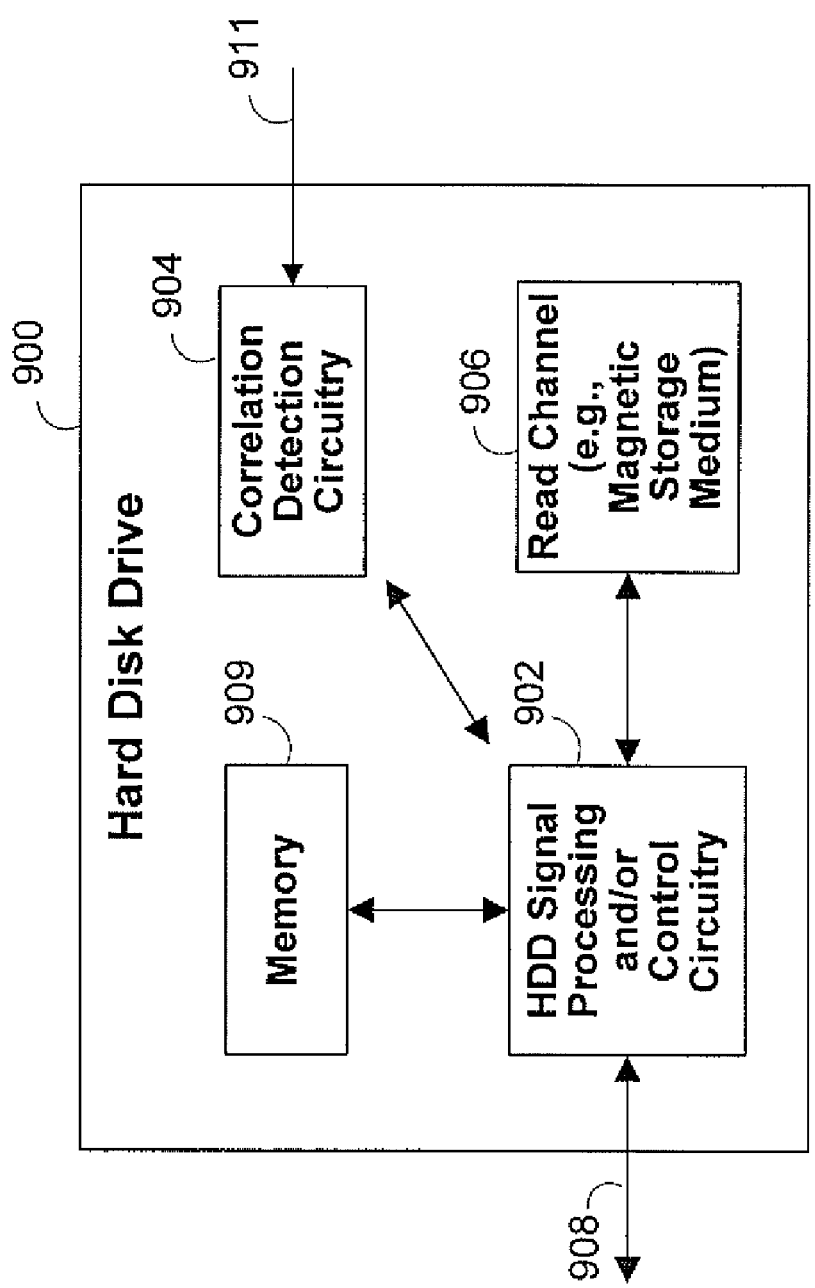
FIG. 9 is an illustrative hard disk drive employing the sync mark design and/or detection of the present invention.

Referring now to FIG. 9, the present invention may be implemented in hard disk drive 900 or any suitable device including a hard disk drive. The present invention may implement either or both signal processing and/or control circuitry, which are generally identified in FIG. 9 at 902. In some implementations, signal processing and/or control circuitry 902 and/or other circuits (not shown) in HOD 900 may process data, perform coding and/or encryption, perform calculations, and/or format data that is output to and/or received from a magnetic storage medium 906 or any other suitable read channel. Correlation detection circuitry 904, which may be in communication with signal processing and/or control circuitry 902, is configured to detect sector sync marks on magnetic storage medium 906 using correlation detection, as described in more detail above in process 800 (FIG. 8).

Although correlation detection circuitry 904 is shown separate from signal processing and/or control circuitry 902, in practice these two components may be integrated or combined into a single device or component, if desired. Correlation detection circuitry 904 may include at least one PLL or similar circuitry to establish at least one timing phase based on a sector preamble read from magnetic storage medium 906. Correlation detection circuitry 904 may also include any number of accumulators and suitable logic blocks for implementing a correlation detector and/or a Viterbi detector. Correlation detection may then be performed using the established timing parameters to detect sync marks on magnetic storage medium 906.

In some embodiments, correlation detection circuitry 904 may be configured to selectively use both correlation detection and traditional Viterbi-based detection. In these embodiments, a detection type control signal 911 may be asserted when correlation detection is to be used to detect disk sync marks, and the detection type control signal may be deasserted when Viterbi-based detection is to be used to detect disk sync marks. The sync mark detection type (i.e., Viterbi-based or correlation-based) may be dynamically altered on-the-fly, if desired, by reading the detection type control signal before each sector preamble read.

HDD 900 may communicate with a host device (not shown) such as a computer, mobile computing devices such as personal digital assistants, cellular phones, media or MP3 players and the like, and/or other devices via one or more wired or wireless communication links 908. HDD 900 may be connected to memory 909 such as random access memory (RAM), low latency nonvolatile memory such as flash memory, read only memory (ROM) and/or other suitable electronic data storage.

It will be understood that the foregoing is only illustrative of the principles of the invention, and that various modifications can be made by those skilled in the art without departing from the scope and spirit of the invention.

What is claimed is:

1. An apparatus for detecting a disk sync mark, the apparatus comprising:
   a read channel configured to read a plurality of sector preamble bits;
   control circuitry configured to establish at least one timing phase based on the sector preamble bits; and
   correlation detection circuitry configured to detect, using correlation detection, a target data pattern for the disk sync mark at a period determined at least in part by the at least one timing phase, wherein the target data pattern is selected from a plurality of candidate target data patterns for the disk sync mark, wherein the plurality of candidate target data patterns for the disk sync mark comprises an initial candidate target data pattern and a plurality of shifted versions of the initial candidate target data pattern, and wherein each one of the plurality of shifted versions is shifted by a corresponding multiple of bits.

2. The apparatus of claim 1, wherein the at least one timing phase comprises a phase of a sector preamble readback waveform.

3. The apparatus of claim 2, wherein the period is equal to a period of the sector preamble readback waveform.

4. The apparatus of claim 1, wherein the at least one timing phase comprises a phase of a sector preamble readback waveform shifted by 180 degrees.

5. The apparatus of claim 4, wherein the period is equal to one-half a period of the sector preamble readback waveform.

6. The apparatus of claim 1, wherein the target data pattern for the disk sync mark comprises a pattern with each bit in an odd position of the pattern taking a same value as its preceding bit in an even position of the pattern.

7. The apparatus of claim 1, wherein the plurality of candidate target data patterns for the disk sync mark are generated from searching a candidate target data pattern bit space for a plurality of initial candidate target data patterns for the disk sync mark and defining a plurality of right-shifted versions of each one of the plurality of initial candidate target data patterns.

8. The apparatus of claim 7, wherein an initial candidate target data pattern of the plurality of initial candidate target data patterns is N-bits long and wherein the plurality of defined right-shifted versions of the initial candidate target data pattern comprises a plurality of N/X right-shifted versions of the initial candidate target data pattern, each right-shifted version shifted by a multiple of X bits.

9. The apparatus of claim 7, wherein at least one of the plurality of sector preamble bits is shifted into higher-order bit positions of the plurality of right-shifted versions.

10. The apparatus of claim 7, wherein the plurality of defined right-shifted versions of each one of the plurality of initial candidate target data patterns comprises a plurality of right-shifted versions of a sign-flipped one of the plurality of initial candidate target data patterns.

11. A method for detecting a disk sync mark, the method comprising:
    reading a plurality of sector preamble bits;
    establishing at least one timing phase based on the sector preamble bits using control circuitry; and
    detecting a target data pattern for the disk sync mark at a period determined at least in part by the at least one timing phase, wherein the target data pattern is selected from a plurality of candidate target data patterns for the disk sync mark, wherein the plurality of candidate target data patterns for the disk sync mark comprises an initial candidate target data pattern and a plurality of shifted versions of the initial candidate target data pattern, and wherein each one of the plurality of shifted versions is shifted by a corresponding multiple of bits.

12. The method of claim 11, wherein the at least one timing phase comprises a phase of a sector preamble readback waveform.

13. The method of claim 11, wherein the at least one timing phase comprises a phase of a sector preamble readback waveform shifted by 180 degrees.

14. The method of claim 12, wherein the period is equal to a period of the sector preamble readback waveform.

15. The method of claim 13, wherein the period is equal to one-half a period of the sector preamble readback waveform.

16. The method of claim 11, wherein the target data pattern for the disk sync mark comprises a pattern with each bit in an odd position of the pattern taking a same value as its preceding bit in an even position of the pattern.

17. The method of claim 11, wherein the plurality of candidate target data patterns for the disk sync mark are generated from searching a candidate target data pattern bit space for a plurality of initial candidate target data patterns for the disk sync mark and defining a plurality of right-shifted versions of each one of the plurality of initial candidate target data patterns.

18. The method of claim 17, wherein an initial candidate target data pattern of the plurality of initial candidate target data patterns is N-bits long and wherein defining the plurality of right-shifted versions of the initial candidate target data pattern comprises defining a plurality of N/X right-shifted versions of the initial candidate target data pattern, each right-shifted version shifted by a multiple of X bits.

19. The method of claim 17, wherein defining the plurality of right-shifted versions of each one of the plurality of initial candidate target data patterns comprises shifting in at least one of the plurality of sector preamble bits into higher-order bit positions of the plurality of right-shifted versions.

20. The method of claim 17, wherein defining the plurality of right-shifted versions of each one of the plurality of initial candidate target data patterns comprises defining a plurality of right-shifted versions of a sign-flipped one of the plurality of initial candidate target data patterns.

* * * * *